United States Patent
Li et al.

(10) Patent No.: US 10,303,241 B2
(45) Date of Patent: May 28, 2019

(54) SYSTEM AND METHOD FOR FINE-GRAINED POWER CONTROL MANAGEMENT IN A HIGH CAPACITY COMPUTER CLUSTER

(71) Applicant: Alibaba Group Holding Limited, George Town, Grand Cayman (KY)

(72) Inventors: Shu Li, Bothell, WA (US); Ping Zhou, Folsom, CA (US)

(73) Assignee: Alibaba Group Holding Limited, George Town (KY)

( * ) Notice: Subject to any disclaimer, the term of this patent is extended or adjusted under 35 U.S.C. 154(b) by 18 days.

(21) Appl. No.: 15/627,047

(22) Filed: Jun. 19, 2017

(65) Prior Publication Data
US 2018/0364795 A1    Dec. 20, 2018

(51) Int. Cl.
G06F 16/23     (2019.01)
G06F 1/3228    (2019.01)
G06F 1/3296    (2019.01)

(52) U.S. Cl.
CPC .......... *G06F 1/3296* (2013.01); *G06F 1/3228* (2013.01); *G06F 16/23* (2019.01)

(58) Field of Classification Search
CPC ................. G06F 1/3296; G06F 1/3228; G06F 17/30345; G06F 16/23
See application file for complete search history.

(56) References Cited

U.S. PATENT DOCUMENTS

| | | | |
|---|---|---|---|
| 4,775,932 A | 10/1988 | Oxley | |
| 6,226,650 B1 | 5/2001 | Mahajan et al. | |
| 7,565,454 B2 | 7/2009 | Zuberi | |
| 8,260,924 B2 | 9/2012 | Koretz | |
| 8,452,819 B1 | 5/2013 | Sorenson, III | |

(Continued)

FOREIGN PATENT DOCUMENTS

| | | |
|---|---|---|
| JP | 2003022209 | 1/2003 |
| JP | 2011175422 | 9/2011 |
| WO | 1994018634 | 8/1994 |

OTHER PUBLICATIONS https://web.archive.org/web/20071130235034/http://en.wikipedia.org:80/wiki/logical_block_addressing wikipedia screen shot retriefed on wayback Nov. 20, 2007 showing both physical and logical addressing used historically to access data on storage devices (Year: 2007).

*Primary Examiner* — Austin Hicks
(74) *Attorney, Agent, or Firm* — Shun Yao; Park, Vaughan, Fleming & Dowler LLP

(57) ABSTRACT

One embodiment of the present invention provides a system for a fine-grained power management. The system receives, by a first server, a task assigned based on a global power state, wherein the first server includes one or more drives, a drive includes one or more channels, and a channel includes one or more integrated circuits. The system places an inactive drive into a power-saving mode. The system places an inactive channel of an active drive into the power-saving mode by using a power switch associated with each integrated circuit in the inactive channel. The system places an inactive integrated circuit of an active channel into the power-saving mode by using a power switch associated with the inactive integrated circuit. The system updates a data structure storing the global power state based on a current power state of the first server, the drives, the channels, and the integrated circuits.

20 Claims, 10 Drawing Sheets

(56) References Cited

U.S. PATENT DOCUMENTS

| | | |
|---|---|---|
| 8,516,284 B2 | 8/2013 | Chan |
| 9,092,223 B1 | 7/2015 | Pani |
| 2002/0010783 A1 | 1/2002 | Primak |
| 2002/0161890 A1 | 10/2002 | Chen |
| 2004/0010545 A1 | 1/2004 | Pandya |
| 2004/0255171 A1 | 12/2004 | Zimmer |
| 2004/0268278 A1 | 12/2004 | Hoberman |
| 2005/0038954 A1 | 2/2005 | Saliba |
| 2005/0097126 A1 | 5/2005 | Cabrera |
| 2005/0177755 A1 | 8/2005 | Fung |
| 2005/0235171 A1* | 10/2005 | Igari .................. G06F 1/3228 713/323 |
| 2006/0156012 A1 | 7/2006 | Beeson |
| 2007/0033323 A1 | 2/2007 | Gorobets |
| 2009/0282275 A1 | 11/2009 | Yermalayeu |
| 2010/0229224 A1 | 9/2010 | Etchegoyen |
| 2010/0325367 A1 | 12/2010 | Kornegay |
| 2011/0055458 A1 | 3/2011 | Kuehne |
| 2011/0153903 A1 | 6/2011 | Hinkle |
| 2011/0231598 A1 | 9/2011 | Hatsuda |
| 2011/0292538 A1 | 12/2011 | Haga |
| 2011/0302353 A1 | 12/2011 | Confalonieri |
| 2012/0117399 A1 | 5/2012 | Chan |
| 2012/0246392 A1 | 9/2012 | Cheon |
| 2013/0073798 A1 | 3/2013 | Kang |
| 2013/0145085 A1 | 6/2013 | Yu |
| 2013/0145089 A1 | 6/2013 | Eleftheriou |
| 2013/0159251 A1 | 6/2013 | Skrenta |
| 2013/0166820 A1 | 6/2013 | Batwara |
| 2013/0173845 A1 | 7/2013 | Aslam |
| 2013/0318283 A1 | 11/2013 | Small |
| 2014/0233950 A1* | 8/2014 | Luo .................. H04B 10/272 398/66 |
| 2014/0250259 A1 | 9/2014 | Ke |
| 2014/0310574 A1 | 10/2014 | Yu |
| 2014/0359229 A1 | 12/2014 | Cota-Robles |
| 2014/0365707 A1 | 12/2014 | Talagala |
| 2015/0082317 A1* | 3/2015 | You .................. G06F 9/5094 718/104 |
| 2015/0106556 A1 | 4/2015 | Yu |
| 2015/0142752 A1 | 5/2015 | Chennamsetty |
| 2015/0372597 A1 | 12/2015 | Luo |
| 2016/0098344 A1 | 4/2016 | Gorobets |
| 2016/0110254 A1 | 4/2016 | Cronie |
| 2016/0232103 A1 | 8/2016 | Schmisseur |
| 2016/0239074 A1 | 8/2016 | Lee |
| 2016/0239380 A1 | 8/2016 | Wideman |
| 2016/0343429 A1 | 11/2016 | Nieuwejaar |
| 2016/0350002 A1 | 12/2016 | Vergis |
| 2017/0168986 A1 | 6/2017 | Sajeepa |
| 2017/0353576 A1 | 12/2017 | Guim Bernat |
| 2018/0024772 A1 | 1/2018 | Madraswala |
| 2018/0088867 A1 | 3/2018 | Kaminaga |

\* cited by examiner

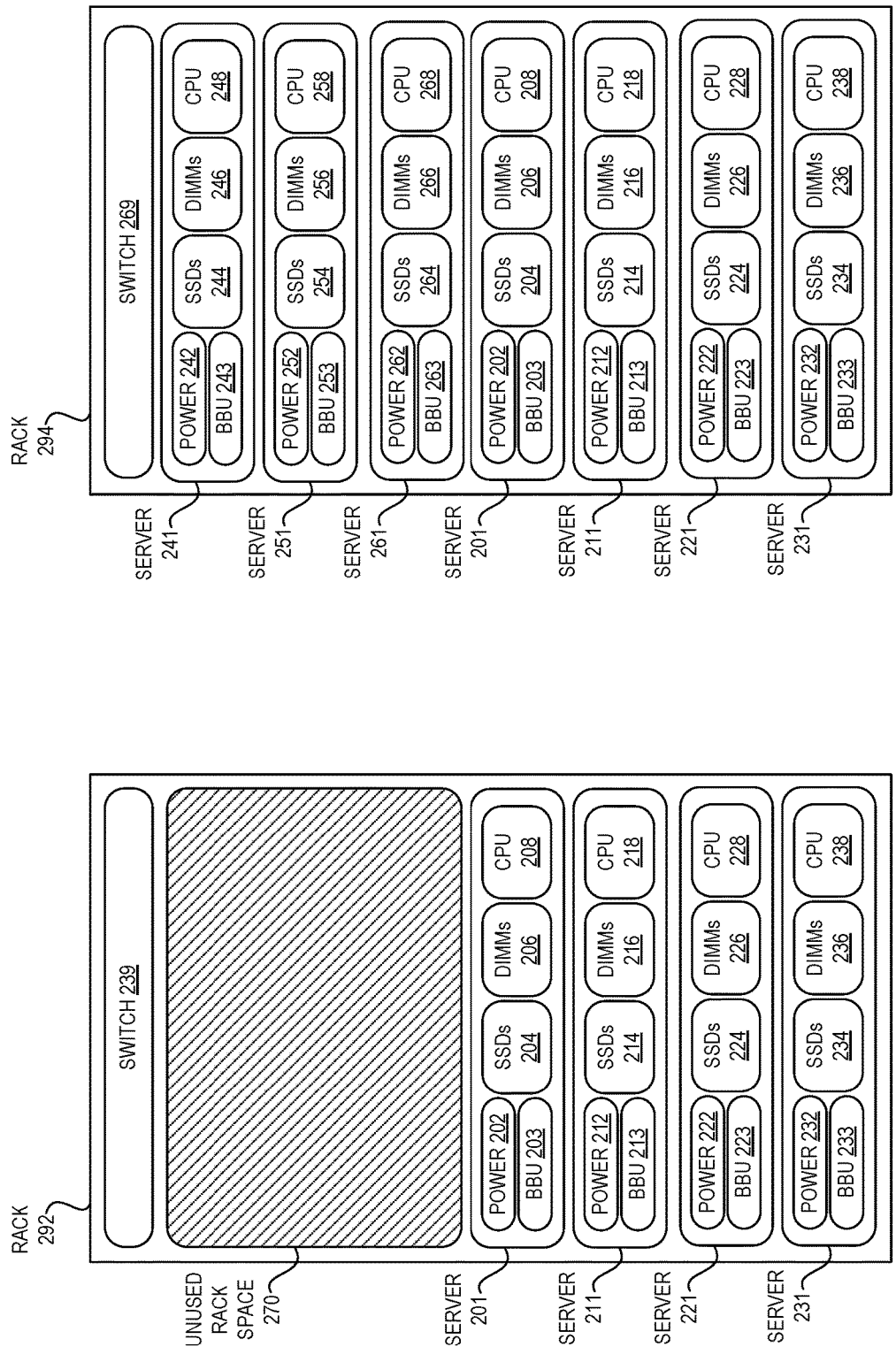

SYSTEM AND METHOD FOR FINE-GRAINED POWER CONTROL MANAGEMENT IN A HIGH CAPACITY COMPUTER CLUSTER

BACKGROUND

Field

This disclosure is generally related to the field of data storage. More specifically, this disclosure is related to a system and method for fine-grained power control management in a computer cluster.

Related Art

The proliferation of the Internet and e-commerce continues to create a vast amount and types of digital content. Data center storage systems have been created to store such digital content. A traditional data center may include multiple racks, where each rack includes multiple servers. One critical concern for designing a data center is ensuring that each server receives sufficient power supply, as insufficient power may result in server malfunction. To address this concern, a traditional data center may estimate a server's peak power to determine the server density within a rack, i.e., the number of servers placed within a rack. At the same time, modern servers may include multiple power-hungry modules (e.g., CPU and GPU) and high capacity storage components (e.g., SSD, HDD, and memory), which can increase the server's overall estimated peak power. As a result, in order to avoid exceeding the estimated power budget for a single rack, the rack design of a traditional data center may only allow or allot for a rack that is partially filled with servers. However, because each rack still incurs a fixed footprint and associated maintenance and operation costs, the inefficiency of a partially filled rack—as opposed to a full rack—may result in a lower power utilization efficiency (PUE) and a higher total cost of ownership (TCO).

SUMMARY

One embodiment of the present invention provides a system for a fine-grained power management of a high-density computer cluster. During operation, the system receives, by a first server in a plurality of servers associated with a rack, a task assigned based on a global power state associated with the servers, wherein the first server includes one or more drives, a drive includes one or more channels, and a channel includes one or more integrated circuits. The system places an inactive drive of the first server into a power-saving mode. The system places an inactive channel of an active drive of the first server into the power-saving mode by using a power switch associated with each integrated circuit in the inactive channel. The system places an inactive integrated circuit of an active channel of an active drive of the first server into the power-saving mode by using a power switch associated with the inactive integrated circuit. The system updates a data structure storing the global power state based on a current power state of the first server, the drives, the channels, and the integrated circuits.

In some embodiments, inactive servers are placed into the power-saving mode, and the data structure is updated based on a current power state of the servers associated with the rack.

In some embodiments, the task is received by a task-distributing component of the first server based on a first objective function which optimizes the global power state associated with the servers and a second objective function which improves a performance parameter, including a Quality of Service. The task-distributing component updates the data structure.

In some embodiments, placing a server, drive, channel, or integrated circuit into the power-saving mode further comprises: adjusting a voltage of a power supply to the server, drive, channel, or integrated circuit by reducing a dynamic power of the power supply and a static power of the power supply.

In some embodiments, a drive includes one or more power islands, and a power island is associated with one or more integrated circuits. The system places an inactive power island into the power-saving mode by using a power switch associated with the inactive power island to shut off one or more integrated circuits associated with the inactive power island.

In some embodiments, the plurality of servers is further associated with a plurality of racks.

In some embodiments, a wake-up signal turns on a high-frequency power module, a transition period occurs between turning on the high-frequency power module and processing data by the associated integrated circuit, and the data is processed by the associated integrated circuit in a time period between the end of the transition period and turning off the high-frequency power module.

In another embodiment, the system receives, by a task-distributing server, an access request. The system determines, by the task-distributing server, a first server in a plurality of servers associated with one or more racks, wherein the first server is determined based on power state data associated with the servers. The system sends, by the task-distributing server, the access request to the first server. The system updates a data structure storing the power state data based on a current power state of the first server.

BRIEF DESCRIPTION OF THE FIGURES

FIG. 2A illustrates an exemplary rack which is partially full based on an estimated peak power of components in the rack, in accordance with the prior art.

FIG. 2B illustrates an exemplary rack which is full based on an estimated peak power of components in the rack, in accordance with an embodiment of the present application.

In the figures, like reference numerals refer to the same figure elements.

DETAILED DESCRIPTION

Figure 1:
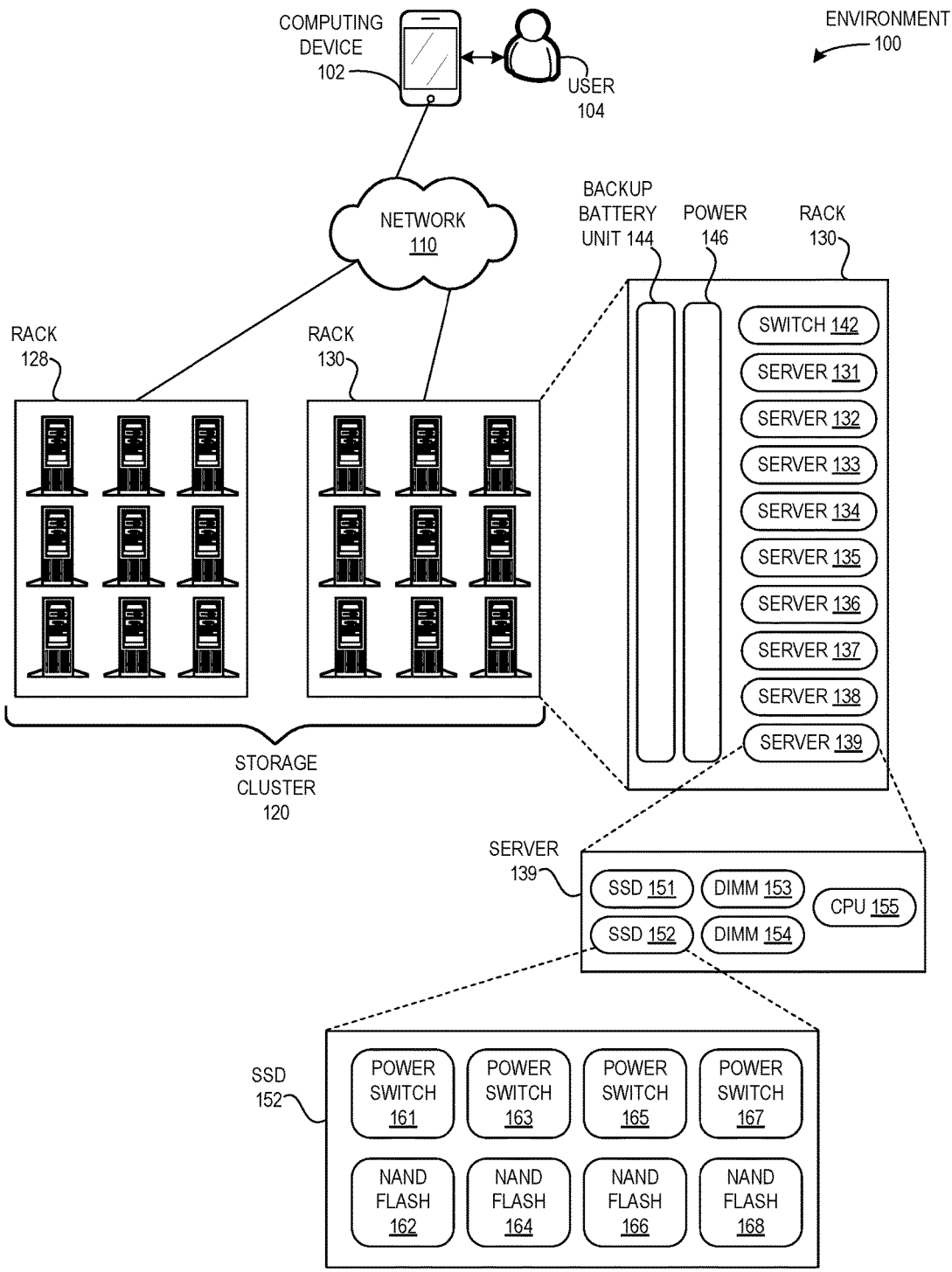
FIG. 1 illustrates an exemplary environment that facilitates a fine-grained power management of a high-density computer cluster, in accordance with an embodiment of the present application.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of increasing the density of servers in a rack by providing a system which performs a fine-grained power management of a high-density computer cluster. In a traditional data center, multiple racks may house multiple servers. One critical concern for designing a data center is ensuring that each server receives sufficient power supply, as insufficient power may result in server malfunction. To address this concern, a traditional data center may estimate a server's peak power to determine the server density within a rack, i.e., the number of servers placed within a rack. At the same time, modern servers with multiple power-hungry modules (e.g., CPU and GPU) and high capacity storage components (e.g., SSD, HDD, and memory) may lead to an increase in the server's overall estimated peak power. As a result, in order to avoid exceeding the estimated power budget for a single rack, the rack design of a traditional data center may only allow or allot for part of a single rack to be filled with servers. However, each rack still incurs a fixed footprint and associated maintenance and operation costs. Thus, a data center design with partially filled racks—as opposed to full racks—may have lower power utilization efficiency (PUE) and higher total cost of ownership (TCO) compared with the ideal situation.

Embodiments of the present invention solve these problems by providing a task distributor which takes into account the current global power state of the system, e.g., a global power map which indicates the current power state of multiple servers in the racks, multiple drives in a respective server, multiple channels in a respective drive, and multiple integrated circuits in a respective channel. One objective function of the task distributor is to maintain the power consumption of each rack within the limit of the rack-supplied power supply (e.g., a single rack's power budget). Another objective function of the task distributor is to improve a performance parameter, e.g., the Quality of Service (QoS). Thus, the task distributor determines which rack/server a task is to be sent based on the global power state and other factors, such as QoS.

Upon receiving a task from the task distributor, a server can schedule the task, turn off or wake up power units (e.g., CPUs, drives, channels, chips, etc.), and update the global power state. The power management and switching as well as the global state updates may be performed periodically at regular intervals (e.g., based on a predetermined interval), or may be performed as part of scheduling each task. For example, the task distributor may determine, based on the global power state and other factors, to send a task to a first server in a rack. The first server can perform a fine-grained power management of its constituent components or parts. The first server can identify and place all of its inactive drives into a power-saving mode. The first server can then identify and place all its inactive channels of all its active drives into the power-saving mode by using a power switch associated with each integrated circuit in an inactive channel. The first server can further identify and place all its inactive integrated circuits of all its active channels into the power-saving mode by using a power switch associated with an inactive integrated circuit. Finally, the first server can update a data structure storing the global power state based on a current power state of the first server and its drives, channels, and integrated circuits.

Similarly, from a system-wide perspective of the data center as a whole, the system can perform the following sequentially granular operations: identify and place all inactive servers into the power-saving mode; identify and place all inactive drives of all active servers into the power-saving mode; identify and place all inactive integrated channels of all active drives into the power-saving mode; and identify and place all inactive integrated circuits of all active channels into the power-saving mode. In some instances, placing a component into a power-saving mode may involve adjusting the voltage of a power supply to a specific component. In other instances, placing a component into the power-saving mode may involve shutting off a power switch associated with a specific component, e.g., a NAND flash drive or other IC.

Thus, embodiments of the present invention provide a system which can increase the PUE and decrease the TCO by facilitating a fine-grained power management of components in racks (e.g., servers, drives, channels, and integrated circuits). The system includes a task distributor which assigns tasks based on a global power state, and the system turns off inactive components in a multi-stage, sequentially granular process. As a result, the system can optimize the power management in a high-density computer cluster, and further improve both the PUE and the TCO.

The term "data center" refers to a logical entity with one or more computer clusters or storage clusters.

The terms "computer cluster" or "storage cluster" refer to multiple servers in multiple racks in a data center. The multiple servers may communicate with each other via the Ethernet.

The term "rack" refers to an entity or a unit in a data center. A rack can include multiple servers or components.

The term "server" refers to a computing device or program which provides functionality for other devices or programs. A server can include multiple drives or components.

The term "drive" refers to a medium capable of storing information, including onto which data may be written for long-term persistent storage. Exemplary drives include solid state drives (SSDs), hard disk drives (HDDs), and dual in-line memory modules (DIMMs). A drive can include multiple components. For example, a drive can include multiple channels, and a channel can include multiple integrated circuits (ICs). Each integrated circuit can have an associated high-frequency power switch. A drive can also include multiple power islands.

The term "power island" refers to a unit for a group of circuits in the same power control area. A power island can be associated with multiple integrated circuits, and each integrated circuit can have an associated high-frequency power switch.

The term "power-consuming unit" refers to a unit, module, or component which consumes power, e.g., a rack, a server, a drive, a CPU, an SSD, a DIMM, a channel, a power island, and an integrated circuit.

The term "power control unit" refers to a unit or module which sends out control signals to power switches associated with each power-consuming unit.

Exemplary System

As described above, embodiments of the present system provide fine-grained power management in sequential stages to more precisely control power consumption by various components within the system, which can improve the overall efficiency of a data center (e.g., by improving both the PUE and the TCO). In general, the power consumption of circuits includes two types: dynamic power; and static or leakage power. Dynamic power may be calculated as follows:

$$P_d = \alpha \cdot C \cdot V_{dd}^2 \cdot f \quad \text{Equation (1)}$$

The term $P_d$ refers to the dynamic power. The term $\alpha$ refers to the activity factor. The term C refers to the equivalent capacitance. The term $V_{dd}$ refers to the power supply. The term f refers to the frequency. The dynamic power may be eliminated by setting the frequency f to a value of "0."

Static or leakage power may be calculated as follows:

$$P_l = V_{dd} \cdot I_{leak} \quad \text{Equation (2)}$$

The term $P_l$ refers to the leakage power, the term $V_{dd}$ refers to the power supply, and the term $I_{leak}$ refers to the leakage current. The leakage power can become non-trivial as the size of power-consuming units continues to decrease. The leakage power may be reduced by shutting off an associated power supply of a power-consuming unit, as described below in relation to FIGS. 4 and 5. Embodiments of the present invention allow precise power-switching of the power supply ($V_{dd}$), where a task distributor assigns tasks based on the global power state per time slot and per physical location.

FIG. 1 illustrates an exemplary environment 100 that facilitates a fine-grained power management of a high-density computer cluster, in accordance with an embodiment of the present application. Environment 100 can include a computing device 102 which is associated with a user 104. Computing device 102 can include, for example, a tablet, a mobile phone, an electronic reader, a laptop computer, a desktop computer, a device with Internet of Things (IOT) capabilities, or any other computing device. Computing device 102 can communicate via a network 110 with a computer cluster or a storage cluster 120, which can include a rack 128 and a rack 130. A rack can include multiple components and servers. For example, rack 130 can include a switch 142, a battery backup unit 144, a power supply 146, and servers 131-139. An exemplary rack is depicted in detail below in relation to FIG. 2C.

A server can include multiple drives. For example, server 139 can include a solid state drive (SSD) 151, an SSD 152, a dual in-line memory module (DIMM) 153, a DIMM 154, and a central processing unit (CPU) 155. Server 139 can also include a power control component (not shown). An exemplary server is depicted in detail below in relation to FIG. 4.

A drive can include multiple integrated circuits. For example, SSD 152 can include NAND flash memories 162-168, each of which is associated, respectively, with power switches 161-167. Sending a shut-off control signal via a power switch (not shown) in SSD 152 to power switch 161 can result in placing the associated NAND flash 162 in a power-saving mode. A drive can include one or more channels, where each channel can include one or more integrated circuits. A drive can also include one or more power islands, where each power island can include one or more integrated circuits. An exemplary drive is depicted in detail below in relation to FIG. 5.

User 104, via computing device 102, can interact with storage cluster 120, which includes racks 128 and 130, by sending an I/O request. For example, user 102 may wish to write some data to storage. The system can process the I/O request using the task distributor and the fine-grained multi-stage sequential power management technique, as described below in relation to FIG. 6.

Exemplary Racks

FIG. 2A illustrates an exemplary rack 292 which is partially full based on an estimated peak power of components in the rack, in accordance with the prior art. Rack 292 can include a switch 239, servers 201, 211, 221, and 231. Server 201 can include a power unit 202, a BBU 203, SSDs 204, DIMMs 206, and a CPU 208. Server 211 can include a power unit 212, a BBU 213, SSDs 214, DIMMs 216, and a CPU 218. Server 221 can include a power unit 222, a BBU 223, SSDs 224, DIMMs 226, and a CPU 228. Server 231 can include a power unit 232, a BBU 233, SSDs 234, DIMMs 236, and a CPU 238. As discussed above, because of the estimated peak power required from the power-hungry components (i.e., SSDs, DIMMs, and CPUs), rack 292 may only be able to supply sufficient power to a fraction or partial number of servers of a full rack, thus resulting in unused rack space 270. This can lead to the inefficiencies described above.

FIG. 2B illustrates an exemplary rack 294 which is full based on an estimated peak power of components in the rack, in accordance with an embodiment of the present application. In rack 294, there is no unused rack space. Instead, rack 294 is a full rack which includes servers 241, 251, 261, 201, 211, 221, and 231. Server 241 can include a power unit 242, a BBU 243, SSDs 244, DIMMs 246, and a CPU 248. Server 251 can include a power unit 252, a BBU 253, SSDs 254, DIMMs 256, and a CPU 258. Server 261 can include a power unit 262, a BBU 263, SSDs 264, DIMMs 266, and a CPU 268.

Figure 2C:
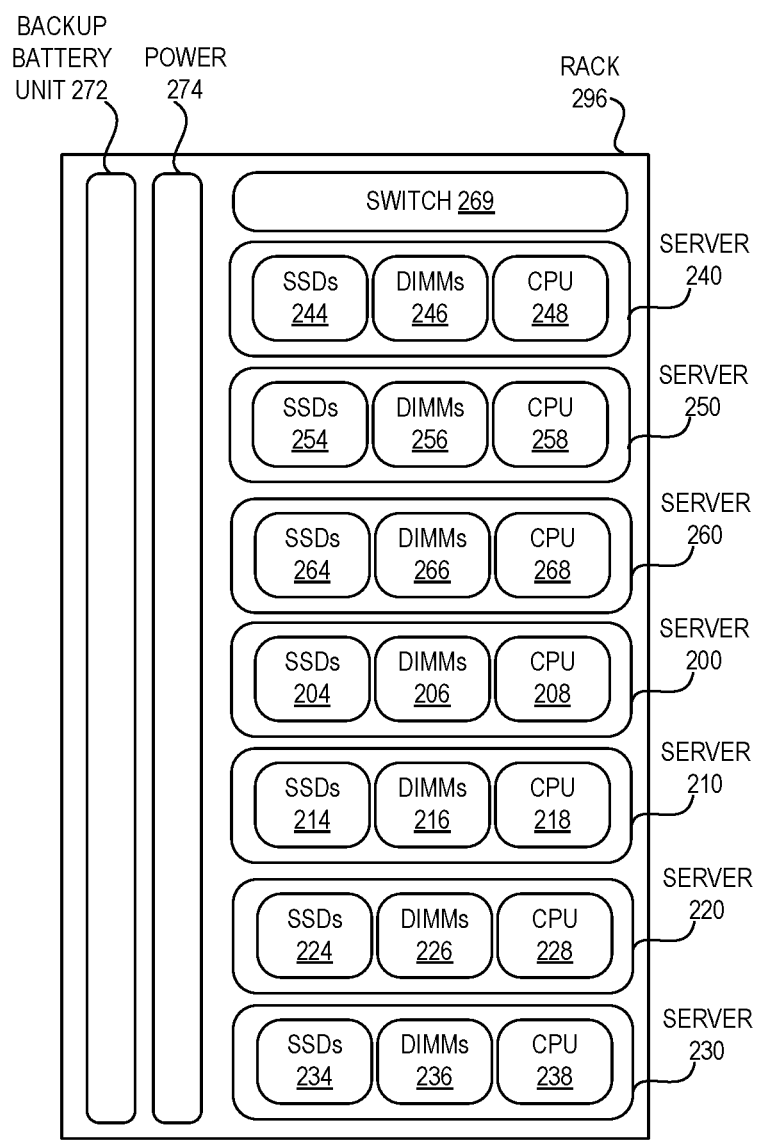
FIG. 2C illustrates an exemplary rack which is full, in accordance with an embodiment of the present application.

FIG. 2C illustrates an exemplary rack 296 which is full, in accordance with an embodiment of the present application. Rack 296 is similar to rack 294, with the difference being that the common power and BBU modules have been removed from each specific server, and are instead consolidated into a shared rack-level BBU 272 and power 274. Consolidating the BBU and power modules in this manner can reduce the overall power consumption in a shared module.

Exemplary Task Distributor

Figure 3:
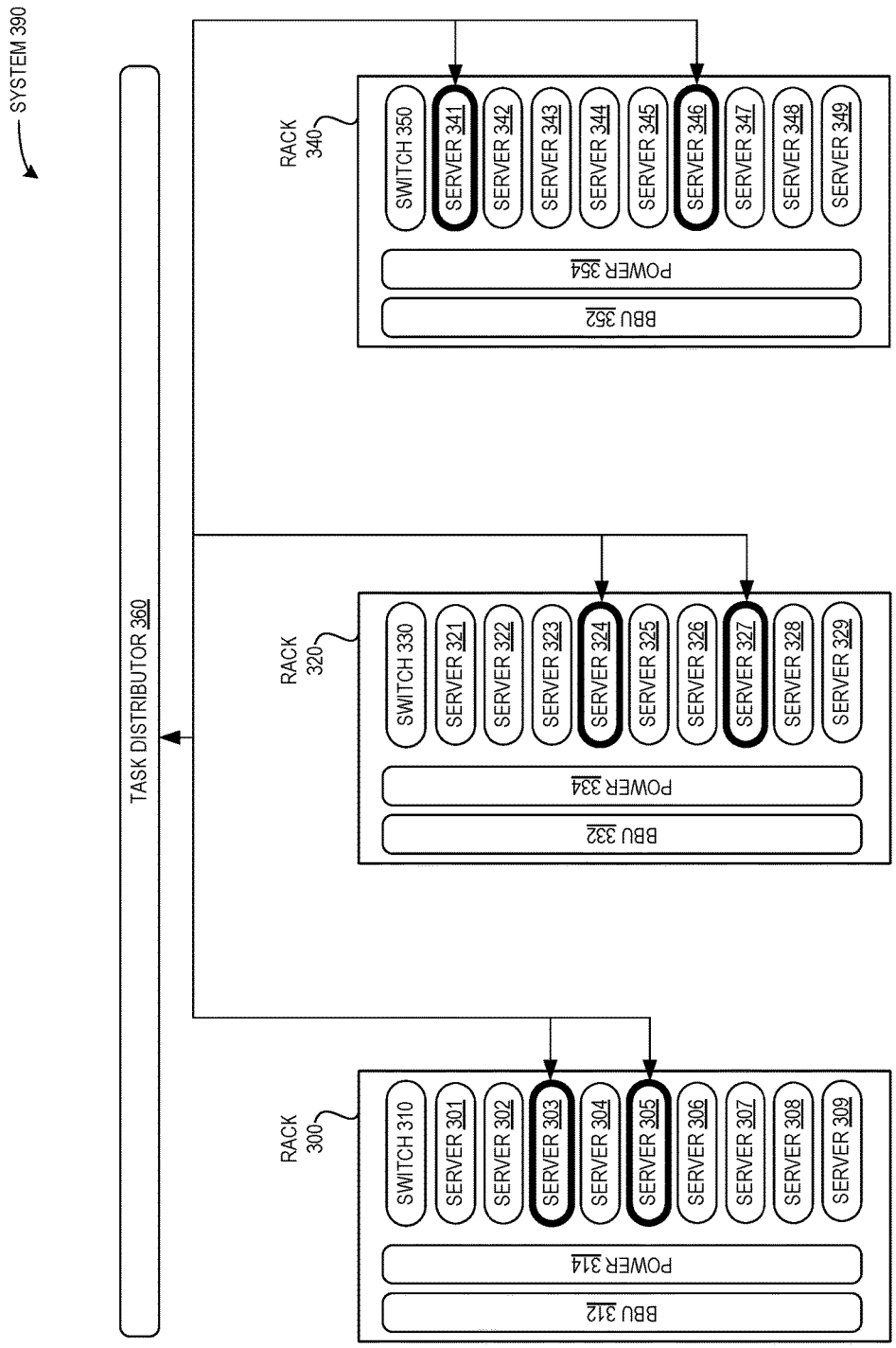
FIG. 3 illustrates an exemplary distributed system for facilitating a fine-grained power management of a high-density computer cluster, in accordance with an embodiment of the present application.

FIG. 3 illustrates an exemplary distributed system 390 for facilitating a fine-grained power management of a high-density computer cluster, in accordance with an embodiment of the present application. System 300 can include a task distributor 360 and racks 300, 320, and 340. Rack 300 can include a BBU 312, a power 314, a switch 310, and servers 301-309. Rack 320 can include a BBU 332, a power 334, a switch 330, and servers 321-329. Rack 340 can include a BBU 352, a power 354, a switch 350, and servers 341-349.

Although task distributor 360 is depicted as a separate module which communicates with multiple racks, note that a task distributor may be deployed in a distributed system as a separate module within each server. A task distributor may be a software program running on, e.g., a storage cluster. Task distributor 360 can monitor the global power state of distributed system 390, i.e., by tracking the current power state of all servers in racks 300, 320, and 340. In some embodiments, the task distributor can track the current power state of all drives in all servers, all channels in all drives, and all integrated circuits in all channels. As described above, the task distributor module is responsible for both maintaining the power consumption of each rack given each rack's power supply limit, and improving the efficiency of the system (e.g., latency, QoS, and reliability). The task distributor evaluates the impact on the power consumption of, e.g., read/write operations. Subsequently, the task distributor assigns an incoming task to a server based on the current global power state, and based on maintaining the power consumption and improving the efficiency of the system.

During operation, task distributor 360 may assign a task from a task queue to any of servers 301-309, 321-329, and 341-349. A task may include an I/O operation, such as writing data to a sector of memory, or performing an arithmetic function. Task distributor 360 may evaluate the current global power state, and determine to send tasks to servers 303 and 305 of rack 300, servers 324 and 327 of rack 320, and servers 341 and 346 of rack 340. These "determined" servers are depicted with a bold outline as active servers, while the remaining servers depicted without the bold outline are in an idle or inactive state. Task distributor 360 may send the tasks to these servers by taking into account the global power state (i.e., the active or inactive state of various other servers in the associated racks). Although the determined servers (i.e., 303, 305, 324, 327, 341, and 346) are depicted as active servers, each determined server includes components which may be idle or inactive. Embodiments of the present invention perform a multi-stage process to turn off all sequentially "smaller" (i.e., more fine-grained) idle or inactive components, as described below in relation to FIG. 6.

Task distributor 360 considers the global power state when processing both client queries (e.g., I/O or read/write operations) and background I/O operations (e.g., backfill, recovery, snapshot, and replications). Note that background I/O operations may consume a considerable amount of storage bandwidth and power. Thus, task distributor 360 balances the assignment of tasks across the servers by accounting for both client and background I/O operations.

Task distributor 360 can originate power control signals, which are sent to each server (e.g., servers 303, 305, 324, 327, 341, and 346). Specifically, the power control signal may be sent to and received by a power control component in each server, as described below in relation to FIG. 4. The task distributor may have knowledge of a global or network topology of the distributed system, including a map of the racks, servers, etc. Using this network topology, the task distributor may send a power control signal to a specific server's power control component via, e.g., TCP/IP or Ethernet.

Exemplary Server with Power Control Component

Figure 4:
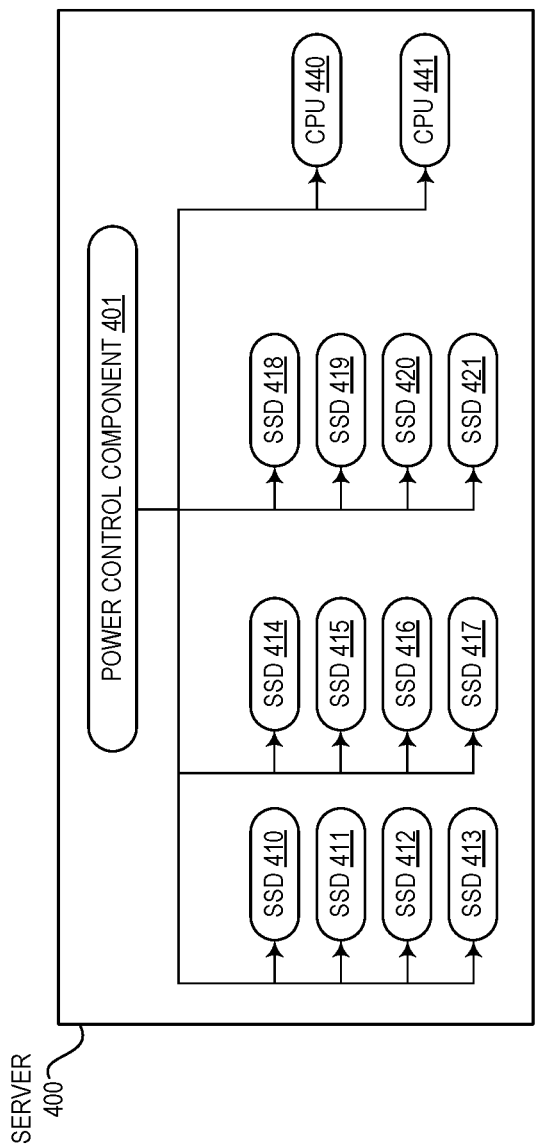
FIG. 4 illustrates an exemplary server in a distributed system for facilitating a fine-grained power management of a high-density computer cluster, in accordance with an embodiment of the present application.

FIG. 4 illustrates an exemplary server 400 in a distributed system for facilitating a fine-grained power management of a high-density computer cluster, in accordance with an embodiment of the present application. Server 400 can include a power control component 401, SSDs 410-421, and CPUs 440-441. During operation, power control component 401 can receive a signal to shut off one or more components or drives of server 400. For example, power control component 401 may receive a signal to shut off all drives which are either currently inactive (e.g., not currently being used) or are set to become inactive in a short or predetermined period of time (e.g., a currently running task will be completed in a short period of time, thus rendering that drive unused or inactive). The system can place these inactive and soon-to-be inactive drives into the power-saving mode by, e.g., adjusting the voltage of the power supply to server 400 and sending the appropriate power control signal to power control component 401.

Exemplary Drive with Power Switch and Controller

Figure 5:
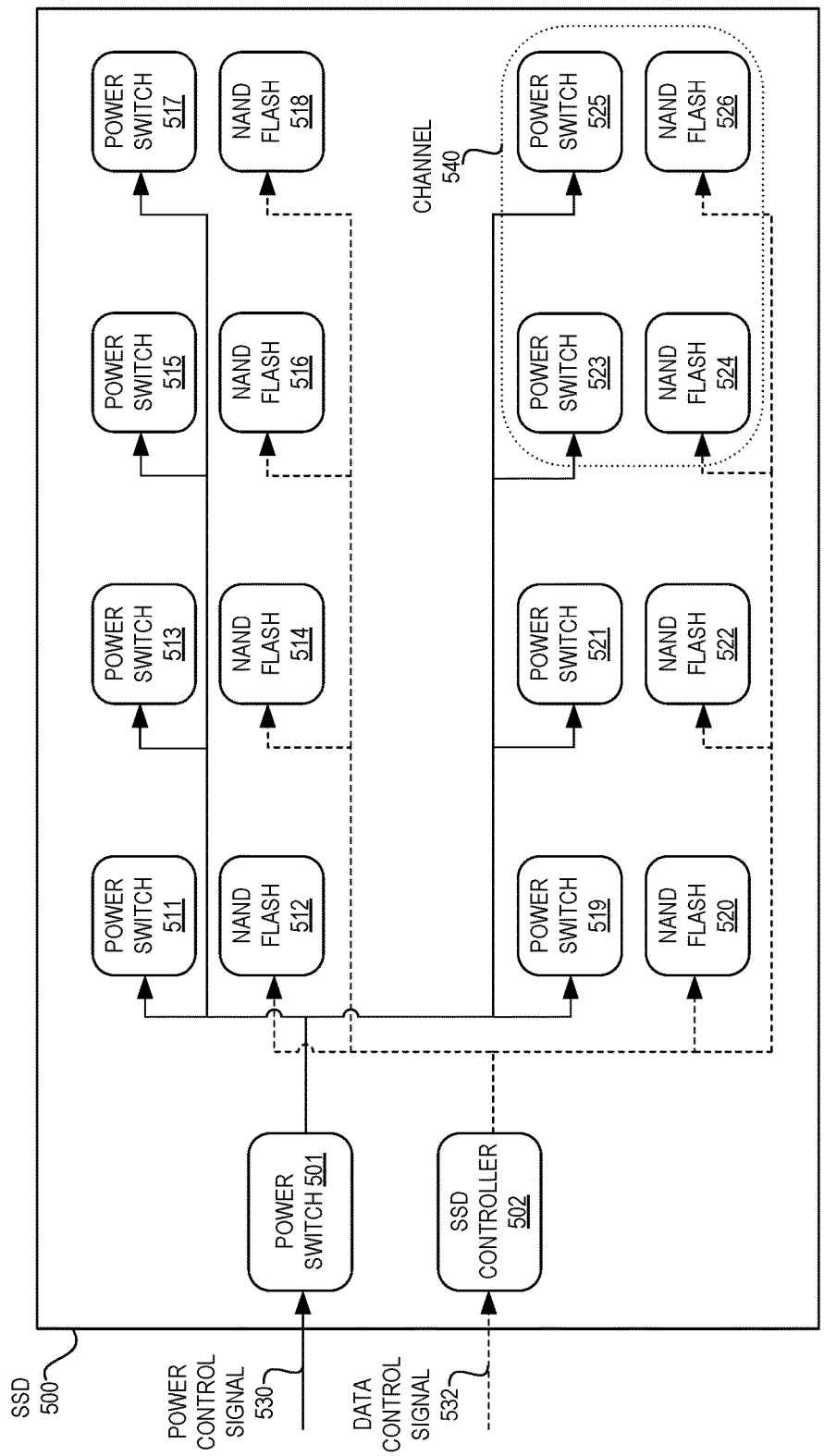
FIG. 5 illustrates an exemplary drive in a server in a distributed system for facilitating a fine-grained power management of a high-density computer cluster, in accordance with an embodiment of the present application.

FIG. 5 illustrates an exemplary drive (SSD) 500 in a server in a distributed system for facilitating a fine-grained power management of a high-density computer cluster, in accordance with an embodiment of the present application. SSD 500 can include a power switch 501 and an SSD controller 502. SSD 500 can also include NAND flash memories 512-526, which are each associated, respectively, with power switches 511-525. SSD 500 can also include a peripheral circuit (not shown) which may not be connected to power switch 501 and SSD controller 502. Power switch 501 can receive a power control signal 530, and subsequently send a signal to shut off one or more of power switches 511-525 (as depicted by the solid lines from power switch 501 to each of power switches 511-525). SSD controller 502 can receive a data control signal 532, and subsequently send data to be written to or read from one or more of NAND flash memories 512-526 (as depicted by the dashed lines from SSD control 502 to NAND flash memories 512-526). The system can thus facilitate a fine-grained power management by utilizing power switches 511-525, which can be high-frequency power switches.

As discussed above, a drive can include multiple channels, and a channel can include multiple integrated circuits. For example, SSD 500 can include a channel 540 which includes NAND flash memories 524 and 526, which are associated, respectively, with power switches 523 and 525. The system can determine that channel 540 is inactive, and place channel 540 into the power-saving mode by shutting off power switches 523 and 525 associated, respectively, with NAND flash memories 524 and 526 of channel 540.

Moreover, a drive can include one or more power islands, where a power island is associated with one or more integrated circuits. A power island can be a unit for a group of circuits in a same power control area. For example, SSD 500 can include a power island (not shown) which includes NAND flashes 520-526, along with the associated power switches 519-525. The system can determine that a power island is inactive, and place such an inactive power island into the power-saving mode by using a power switch (not shown) associated with the inactive power island to shut off the integrated circuits associated with the power island.

Method for Facilitating a Fine-Grained Power Management

Figure 6:
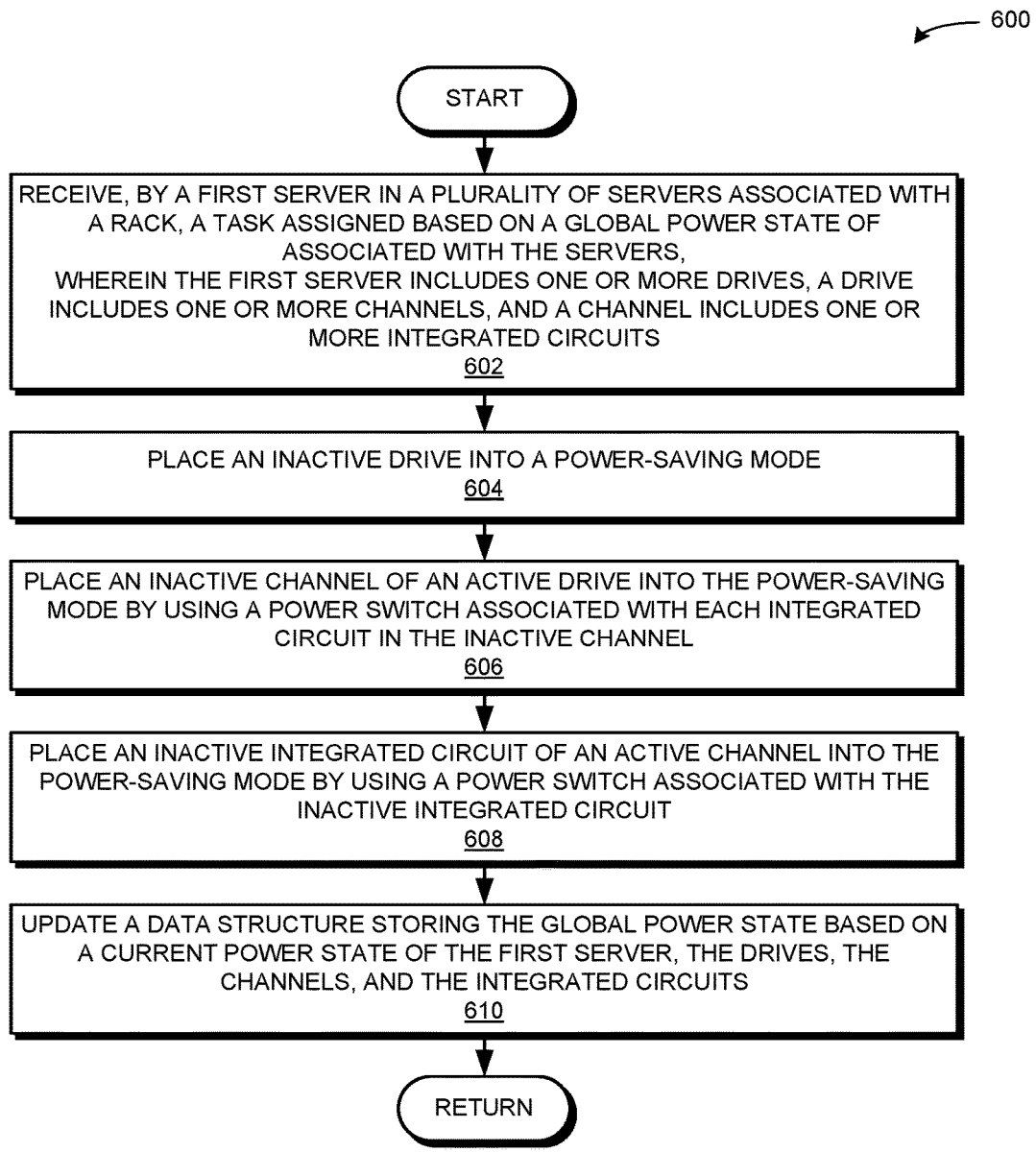
FIG. 6 presents a flowchart illustrating a method by a first server for facilitating a fine-grained power management of a high-density computer cluster, in accordance with an embodiment of the present application.

FIG. 6 presents a flowchart 600 illustrating a method by a first server for facilitating a fine-grained power management of a high-density computer cluster, in accordance with an embodiment of the present application. During operation, the system receives, by a first server in a plurality of servers associated with a rack, a task assigned based on a global power state associated with the servers, wherein the first server includes one or more drives, a drive includes one or more channels, and a channel includes one or more integrated circuits (operation 602). The system places an inactive drive of the first server into a power-saving mode (operation 604). The system places an inactive channel of an active drive (of the first server) into the power-saving mode by using a power switch associated with each integrated circuit in the inactive channel (operation 606). The system places an inactive integrated circuit of an active channel into the power-saving mode by using a power switch associated with the inactive integrated circuit (operation 608). The system updates a data structure storing the global power state based on a current power state of the first server, the drives, the channels, and the integrated circuits (operation 610), thereby facilitating a fine-grained power management of the servers in the rack.

Note that FIG. 6 depicts operations performed by a single server (i.e., the first server) in the distributed system. From the perspective of the distributed system, which includes multiple racks with multiple servers, each server can include a task-distributing component which obtains and receives a task based on the current global power state associated with all servers in the system (i.e., all servers in all racks of the system). As a result, each server can schedule an obtained or assigned task, and can perform the multi-stage power management (e.g., by waking up or turning off power-consuming units such as CPUs, drives, channels, power islands, chips, etc., in the manner described above in relation to FIG. 6).

Each server can also update the global power state based on the obtained task. Each server may perform the power management and the global state updates at periodic or regular time intervals (e.g., based on a predetermined time interval) or upon obtaining or assigning each task. Thus, while FIG. 6 depicts the process for a single server, each server in the distributed system can perform a similar process in parallel, based on the global power state. This allows the system to reach its objective function of maintaining each rack's power consumption within the limit of the rack's budgeted power supply.

Exemplary Time Diagram Illustrating Power Control

Figure 7:
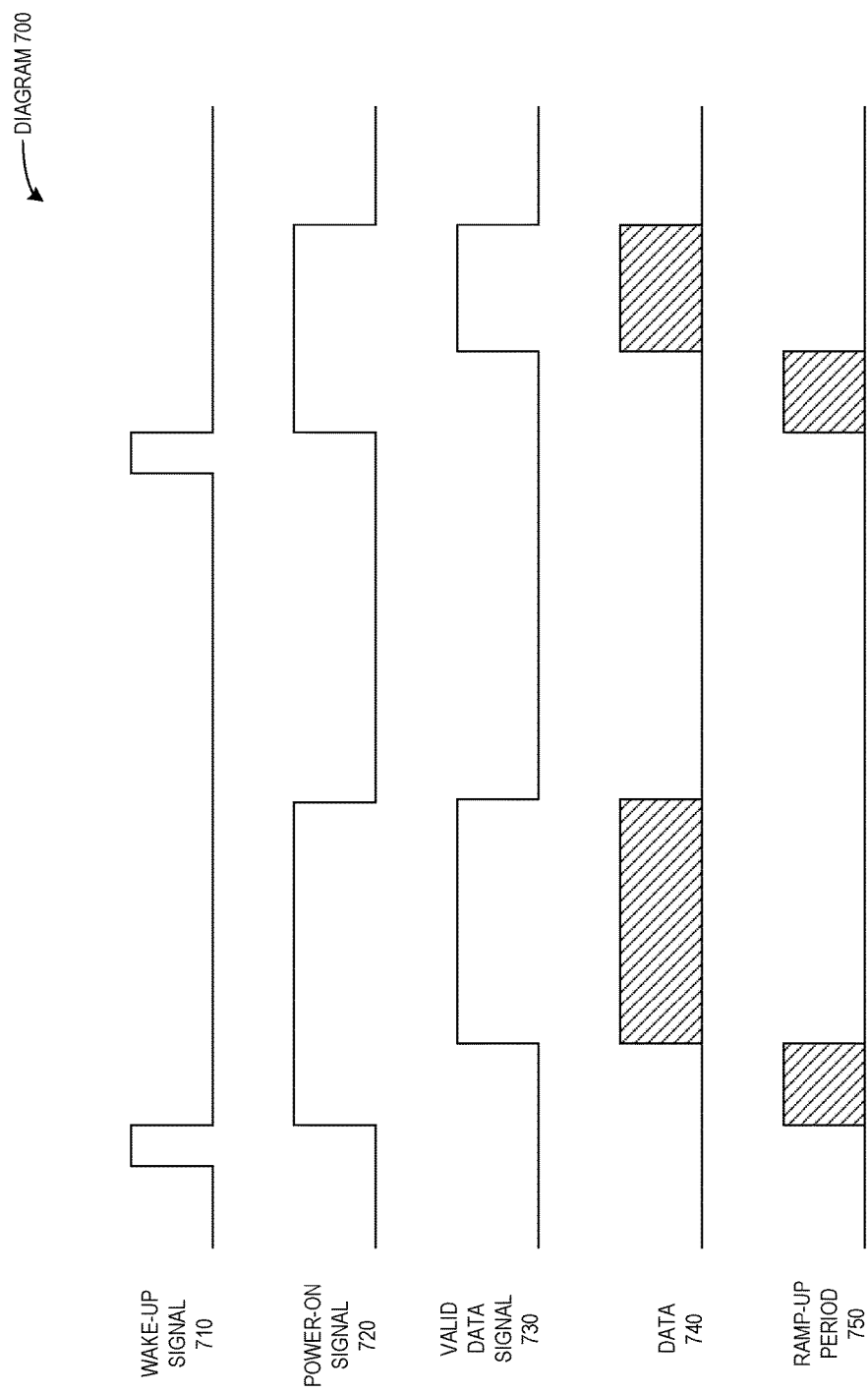
FIG. 7 presents an exemplary time diagram illustrating power control, in accordance with an embodiment of the present application.

FIG. 7 presents an exemplary time diagram 700 illustrating power control, in accordance with an embodiment of the present application. When no load is carried on the circuit, the power supply is switched off. A wake-up signal 710 is used when an upper layer assigns a task, and the power supply is switched on with a power-on signal 720. After a brief ramp-up period 750, the circuit enters a normal functioning (or active) state and begins working on the requested task, as shown by data 740 during a valid data signal 730. When the requested task is completed, the power supply to the circuit is switched off (i.e., by shutting off the high-frequency power switch). Once the high-frequency power switch associated with a specific IC has been shut off, the system does not consume any dynamic or static power based on the specific IC. Because the high-frequency power switch switches off the power supply to an IC upon completion of a task, the IC does not spend any time in an inactive but powered-on state, which can consume static power. Instead, the idle or inactive IC is placed in a power-saving mode by shutting off the high-frequency power switch.

Exemplary Computer System and Apparatus/Device

Figure 8:
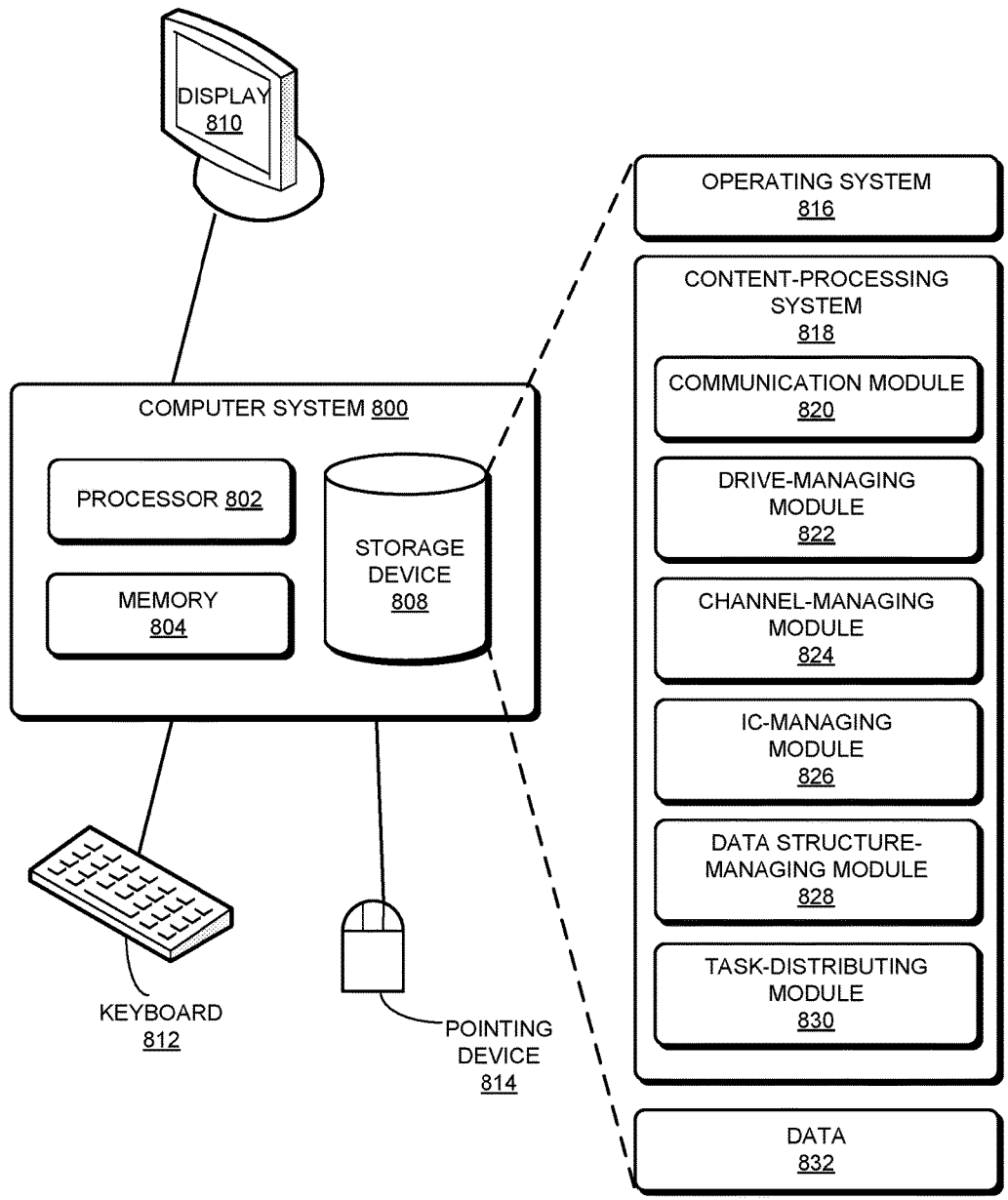
FIG. 8 illustrates an exemplary computer system that facilitates a fine-grained power management of a high-density computer cluster, in accordance with an embodiment of the present application.

FIG. 8 illustrates an exemplary computer system 800 that facilitates a fine-grained power management of a high-density computer cluster, in accordance with an embodiment of the present application. Computer system 800 includes a processor 802, a memory 804, and a storage device 808. Memory 804 can include a volatile memory (e.g., RAM) that serves as a managed memory, and can be used to store one or more memory pools. Furthermore, computer system 800 can be coupled to a display device 810, a keyboard 812, and a pointing device 814. Storage device 808 can store an operating system 816, a content-processing system 818, and data 832.

Content-processing system 818 can include instructions, which when executed by computer system 800, can cause computer system 800 to perform methods and/or processes described in this disclosure. Specifically, content-processing system 818 can include instructions for receiving and transmitting data packets, including a task or a command to place a component into a power-saving mode or to turn off a power switch. Content-processing system 818 can include instructions for receiving, by a first server in a plurality of servers associated with a rack, a task assigned based on a global power state associated with the servers, wherein the first server includes one or more drives, a drive includes one or more channels, and a channel includes one or more integrated circuits (communication module 820 and task-distributing module 830).

Content-processing system 818 can include instructions for placing an inactive drive into a power-saving mode (drive-managing module 822). Content-processing system 818 can include instructions for placing an inactive channel of an active drive into the power-saving mode by using a power switch associated with each integrated circuit in the inactive channel (channel-managing module 824). Content-processing system 818 can include instructions for placing an inactive integrated circuit of an active channel into the power-saving mode by using a power switch associated with the inactive integrated circuit (IC-managing module 826). Content-processing system 818 can include instructions for updating a data structure storing the global power state based on a current power state of the first server, the drives, the channels, and the integrated circuits (data-structure managing module 828).

Content-processing system 818 can include also instructions for placing an inactive power island into the power-saving mode by using a power switch associated with the inactive power island to shut off one or more integrated circuits associated with the inactive power island (IC-managing module 826).

Data 832 can include any data that is required as input or that is generated as output by the methods and/or processes described in this disclosure. Specifically, data 832 can store at least: a task; a command or indicator to place a server, driver, channel, integrated circuit, or power island into a power-saving mode; a data structure; a global power state; an indicator or identifier of a rack, server, drive, channel, or integrated circuit; a power controller component; a power unit; a power switch; a high-frequency power switch; a task distributing component; a function which optimizes the global power state; a function which improves a performance parameter, including a QoS; a voltage; an indicator of a dynamic or a static power supply; a wake-up signal; a transition period; a ramp-up period; a data valid signal; a data signal; and a power control signal.

Figure 9:
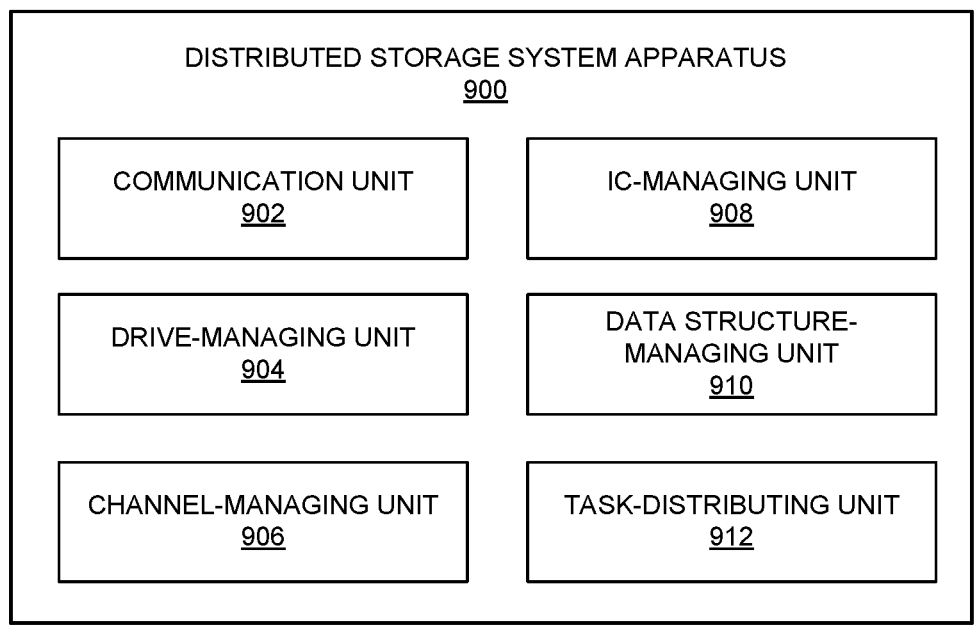
FIG. 9 illustrates an exemplary apparatus that facilitates a fine-grained power management of a high-density computer cluster, in accordance with an embodiment of the present application.

FIG. 9 illustrates an exemplary apparatus 900 that facilitates a fine-grained power management of a high-density computer cluster, in accordance with an embodiment of the present application. Apparatus 900 can comprise a plurality of units or apparatuses which may communicate with one another via a wired, wireless, quantum light, or electrical communication channel. Device 900 may be realized using one or more integrated circuits, and may include fewer or more units or apparatuses than those shown in FIG. 9. Further, device 900 may be integrated in a computer system, or realized as a separate device which is capable of communicating with other computer systems and/or devices. Specifically, device 900 can comprise units 902-912 which perform functions or operations similar to modules 820-830 of computer system 800 of FIG. 8, including: a communication unit 902; a drive-managing unit 904; a channel-managing unit 906; an IC-managing unit 908; a data structure-managing unit 910; and a task-distributing unit 912.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for facilitating a fine-grained power management of a high-density computer cluster, the method comprising:
   receiving, by a first server in a plurality of servers associated with a rack, a task assigned based on a current global power state associated with the servers, wherein the current global power state comprises a global power map stored in a data structure which indicates a current power state of the plurality of servers associated with the rack, each of a plurality of drives in a respective server, each of a plurality of channels in a respective drive, and each of a plurality of integrated circuits in a respective channel;
   placing an inactive drive of the first server into a power-saving mode to obtain an updated power state of the drives of the first server;
   placing an inactive channel of an active drive of the first server into the power-saving mode by using a power switch associated with each integrated circuit in the inactive channel, to obtain an updated power state of the channels of the drives;
   placing an inactive integrated circuit of an active channel of an active drive of the first server into the power-saving mode by using a power switch associated with the inactive integrated circuit, to obtain an updated power state of the integrated circuits of the channels;
   obtaining an updated power state of the first server based on the updated power state of the inactive drive, the inactive channel, and the inactive integrated circuits; and
   updating the data structure storing the global power map based on the updated power state of the first server, the drives, the channels, and the integrated circuits.

2. The method of claim 1, wherein inactive servers are placed into the power-saving mode, and wherein the data structure is updated based on a current power state of the servers associated with the rack.

3. The method of claim 1, wherein the task is received by a task-distributing component of the first server based on a first objective function which optimizes the global power state associated with the servers and a second objective function which improves a performance parameter, including a Quality of Service, and
   wherein the task-distributing component updates the data structure.

4. The method of claim 1, wherein placing a server, drive, channel, or integrated circuit into the power-saving mode further comprises:
   adjusting a voltage of a power supply to the server, drive, channel, or integrated circuit by reducing a dynamic power of the power supply and a static power of the power supply.

5. The method of claim 1, wherein a drive includes one or more power islands, wherein a power island is associated with one or more integrated circuits, wherein the method further comprises:
   placing an inactive power island into the power-saving mode by using a power switch associated with the inactive power island to shut off one or more integrated circuits associated with the inactive power island.

6. The method of claim 1, wherein the plurality of servers is further associated with a plurality of racks.

7. The method of claim 1,
   wherein a wake-up signal turns on a high-frequency power module,
   wherein a transition period occurs between turning on the high-frequency power module and processing data by the associated integrated circuit, and
   wherein the data is processed by the associated integrated circuit in a time period between the end of the transition period and turning off the high-frequency power module.

8. A computer system facilitating a fine-grained power management of a high-density computer cluster, the system comprising:
   a processor; and
   a memory coupled to the processor and storing instructions, which when executed by the processor cause the processor to perform a method, the method comprising:
      receiving, by a first server in a plurality of servers associated with a rack, a task assigned based on a current global power state associated with the servers,
      wherein the current global power state comprises a global power map stored in a data structure which indicates a current power state of the plurality of servers associated with the rack, each of a plurality of drives in a respective server, each of a plurality of channels in a respective drive, and each of a plurality of integrated circuits in a respective channel;

placing an inactive drive of the first server into a power-saving mode to obtain an updated power state of the drives of the first server;

placing an inactive channel of an active drive of the first server into the power-saving mode by using a power switch associated with each integrated circuit in the inactive channel, to obtain an updated power state of the channels of the drives;

placing an inactive integrated circuit of an active channel of an active drive of the first server into the power-saving mode by using a power switch associated with the inactive integrated circuit, to obtain an updated power state of the integrated circuits of the channels;

obtaining an updated power state of the first server based on the updated power state of the inactive drive, the inactive channel, and the inactive integrated circuits; and updating the data structure storing the global power map based on the updated power state of the first server, the drives, the channels, and the integrated circuits.

9. The computer system of claim 8, wherein inactive servers are placed into the power-saving mode, and wherein the data structure is updated based on a current power state of the servers associated with the rack.

10. The computer system of claim 8, wherein the task is received by a task-distributing component of the first server based on a first objective function which optimizes the global power state associated with the servers and a second objective function which improves a performance parameter, including a Quality of Service, and wherein the task-distributing component updates the data structure.

11. The computer system of claim 8, wherein placing a server, drive, channel, or integrated circuit into the power-saving mode further comprises:

adjusting a voltage of a power supply to the server, drive, channel, or integrated circuit by reducing a dynamic power of the power supply and a static power of the power supply.

12. The computer system of claim 8, wherein a drive includes one or more power islands, wherein a power island is associated with one or more integrated circuits, and wherein the method further comprises:

placing an inactive power island into the power-saving mode by using a power switch associated with the inactive power island to shut off one or more integrated circuits associated with the inactive power island.

13. The computer system of claim 8, wherein the plurality of servers is further associated with a plurality of racks.

14. The computer system of claim 8, wherein a wake-up signal turns on a high-frequency power module, wherein a transition period occurs between turning on the high-frequency power module and processing data by the associated integrated circuit, and wherein the data is processed by the associated integrated circuit in a time period between the end of the transition period and turning off the high-frequency power module.

15. A non-transitory computer-readable storage medium storing instructions that when executed by a computer cause the computer to perform a method, the method comprising:

receiving, by a first server in a plurality of servers associated with a rack, a task assigned based on a current global power state associated with the servers, wherein the current global power state comprises a global power map stored in a data structure which indicates a current power state of the plurality of servers associated with the rack, each of a plurality of drives in a respective server, each of a plurality of channels in a respective drive, and each of a plurality of integrated circuits in a respective channel;

placing an inactive drive of the first server into a power-saving mode to obtain an updated power state of the drives of the first server;

placing an inactive channel of an active drive of the first server into the power-saving mode by using a power switch associated with each integrated circuit in the inactive channel, to obtain an updated power state of the channels of the drives;

placing an inactive integrated circuit of an active channel of an active drive of the first server into the power-saving mode by using a power switch associated with the inactive integrated circuit, to obtain an updated power state of the integrated circuits of the channels;

obtaining an updated power state of the first server based on the updated power state of the inactive drive, the inactive channel, and the inactive integrated circuits; and updating the data structure storing the global power map based on the updated power state of the first server, the drives, the channels, and the integrated circuits.

16. The storage medium of claim 15, wherein inactive servers are placed into the power-saving mode, and wherein the data structure is updated based on a current power state of the servers associated with the rack.

17. The storage medium of claim 15, wherein the task is received by a task-distributing component of the first server based on a first objective function which optimizes the global power state associated with the servers and a second objective function which improves a performance parameter, including a Quality of Service, and wherein the task-distributing component updates the data structure.

18. The storage medium of claim 15, wherein placing a server, drive, channel, or integrated circuit into the power-saving mode further comprises:

adjusting a voltage of a power supply to the server, drive, channel, or integrated circuit by reducing a dynamic power of the power supply and a static power of the power supply.

19. The storage medium of claim 15, wherein a drive includes one or more power islands, wherein a power island is associated with one or more integrated circuits, and wherein the method further comprises:

placing an inactive power island into the power-saving mode by using a power switch associated with the inactive power island to shut off one or more integrated circuits associated with the inactive power island.

20. The storage medium of claim 15, wherein a wake-up signal turns on a high-frequency power module, wherein a transition period occurs between turning on the high-frequency power module and processing data by the associated integrated circuit, and wherein the data is processed by the associated integrated circuit in a time period between the end of the transition period and turning off the high-frequency power module.

* * * * *